(12) United States Patent
Qi et al.

(10) Patent No.: US 6,754,629 B1
(45) Date of Patent: Jun. 22, 2004

(54) SYSTEM AND METHOD FOR AUTOMATIC VOICE RECOGNITION USING MAPPING

(75) Inventors: Yingyong Qi, San Diego, CA (US); Ning Bi, San Diego, CA (US); Harinath Garudadri, San Diego, CA (US)

(73) Assignee: Qualcomm Incorporated

( * ) Notice: Subject to any disclaimer, the term of this patent is extended or adjusted under 35 U.S.C. 154(b) by 452 days.

(21) Appl. No.: 09/657,760

(22) Filed: Sep. 8, 2000

(51) Int. Cl.[7] ............................................. G10L 17/00
(52) U.S. Cl. ...................... 704/246; 704/238; 704/255; 704/256
(58) Field of Search ................................ 704/231, 246, 704/255, 256, 236, 238, 241

(56) References Cited

U.S. PATENT DOCUMENTS

| | | | | |
|---|---|---|---|---|
| 4,763,278 A | * | 8/1988 | Rajasekaran | 704/251 |
| 4,783,804 A | * | 11/1988 | Juang | 704/245 |
| 4,831,551 A | * | 5/1989 | Schalk | 704/233 |
| 5,073,939 A | * | 12/1991 | Vensko | 704/241 |
| 5,717,826 A | * | 2/1998 | Sethur et al. | 704/252 |
| 5,734,793 A | | 3/1998 | Wang | |
| 5,754,978 A | * | 5/1998 | Perez-Mendez | 704/255 |
| 6,125,341 A | * | 9/2000 | Raud | 704/8 |
| 6,272,455 B1 | * | 8/2001 | Hoshen | 704/1 |
| 6,275,800 B1 | * | 8/2001 | Chevalier | 704/246 |
| 6,321,195 B1 | * | 11/2001 | Lee | 704/241 |

FOREIGN PATENT DOCUMENTS

| | | | | |
|---|---|---|---|---|
| EP | 0955628 A2 | 11/1999 | | |
| WO | WO 00/58945 | * 10/2000 | .......... | G10L/15/26 |
| WO | 02/07148 A1 | 1/2002 | | |

OTHER PUBLICATIONS

Lawrence Rabiner & Biing-Hwang Juang: "Fundamentals of Speech Recognition," pp. 200–238 (1993).
Djamel Bouchaffra et al. "A Methodology for Mapping Scores to Probabilities," IEEE Transactions on Pattern Analysis and Machine Intelligence, IEEE Inc. New York, US, vol. 21, No. 9, Sep. 1999 (pp. 923–927).

* cited by examiner

Primary Examiner—Richemond Dorvil
Assistant Examiner—Kinari Patel
(74) Attorney, Agent, or Firm—Philip Wadsworth; Charles D. Brown; Kyong H. Macek

(57) ABSTRACT

A method and system that combines voice recognition engines and resolves differences between the results of individual voice recognition engines using a mapping function. Speaker independent voice recognition engines and speaker-dependent voice recognition engines are combined. Hidden Markov Model (HMM) engines and Dynamic Time Warping (DTW) engines are combined.

13 Claims, 3 Drawing Sheets

SYSTEM AND METHOD FOR AUTOMATIC VOICE RECOGNITION USING MAPPING

BACKGROUND

I. Field

The present invention pertains generally to the field of communications and more specifically to a novel and improved system and method for voice recognition.

II. Background

Voice recognition (VR) represents one of the most important techniques to endow a machine with simulated intelligence to recognize user or user-voiced commands and to facilitate human interface with the machine. VR also represents a key technique for human speech understanding. Systems that employ techniques to recover a linguistic message from an acoustic speech signal are called voice recognizers. The term "voice recognizer" is used herein to mean generally any spoken-user-interface-enabled device.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. In addition, a hands-free car-kit system would permit the driver to maintain both hands on the steering wheel during call initiation.

Speech recognition devices are classified as either speaker-dependent (SD) or speaker-independent (SI) devices. Speaker-dependent devices, which are more common, are trained to recognize commands from particular users. In contrast, speaker-independent devices are capable of accepting voice commands from any user. To increase the performance of a given VR system, whether speaker-dependent or speaker-independent, training is required to equip the system with valid parameters. In other words, the system needs to learn before it can function optimally.

A speaker-dependent VR device typically operates in two phases, a training phase and a recognition phase. In the training phase, the VR system prompts the user to speak each of the words in the system's vocabulary once or twice (typically twice) so the system can learn the characteristics of the user's speech for these particular words or phrases. An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls in the recognition phase by speaking the trained keywords, which the VR device recognizes by comparing the spoken utterances with the previously trained utterances (stored as templates) and taking the best match. For example, if the name "John" were one of the trained names, the user could initiate a call to John by saying the phrase "Call John." The VR system would recognize the words "Call" and "John," and would dial the number that the user had previously entered as John's telephone number. Systems and methods for training A speaker-independent VR device also uses a training template that contains a prerecorded vocabulary of a predefined size (e.g., certain control words, the numbers zero through nine, and yes and no). A large number of speakers (e.g., 100) must be recorded saying each word in the vocabulary.

Different speaker independent VR devices may yield different results. For example, a speaker independent (SI) Hidden Markov Model (HMM) engine may yield a different result than a speaker independent Dynamic Time Warping (DTW) engine. Combining the results of both these engines can result in a system with better recognition accuracy and lower rejection rates than using the results of only one of the engines.

A speaker-dependent VR and a speaker independent VR may yield different results. A speaker-dependent engine performs recognition using templates pertaining to a specific user. A speaker independent engine performs recognition using templates generated using exemplars from an ensemble of users. Since speaker specific templates are closer to a given user's speaking style, SD engines provide better accuracy than SI engines. However, SI engines have the advantage that the users need not go through the "training process" prior to using the system.

A system and method that combines engines of different types is desired. Combining multiple engines would provide enhanced accuracy and use a greater amount of information in the input speech signal. A system and method for combining VR engines is described in U.S. patent application Ser. No. 09/618,177 entitled "Combined Engine System and Method for Voice Recognition", filed Jul. 18, 2000, which is assigned to the assignee of the present invention and fully incorporated herein by reference.

A decision logic VR system can use heuristic logic to devise decision rules. The decision logic typically starts with the measured distances between a testing utterance and the top candidate (word) templates of each engine. For example, suppose two engines (engines D and H) are used. Let $d_1$ and $d_2$ denote the distance between the test utterance and the top two candidate words of engine D, and $h_1$ and $h_2$ denote the distance between the test utterance and the top two candidate words of engine H. Let $d_g$ and $h_g$ denotes the distance between the test utterance and the "garbage" templates of engine D and H, respectively. The garbage templates are used to represent all words not in the vocabulary. The decision logic involves a sequence of comparisons among these measured distances and a set of pre-defined thresholds. The comparison rules and thresholds, however, need to be synthesized and adjusted on a trial-by-error basis, in part, because they cannot be systematically optimized. This is a time-consuming and difficult process. In addition, the heuristic rules may be application-dependent. For example, a new set of rules needs to be synthesized if the top three words rather than the top two words are used for each engine. It is likely that the set of rules for recognizing noise-free speech would be different from those for recognizing noisy speech.

Thus, a system and method for resolving different results from a plurality of different VR engines is desired.

SUMMARY

The described embodiments are directed to a system and method for voice recognition. In one embodiment, a method of combining a plurality of voice recognition engines to improve voice recognition is provided. The method advantageously includes coupling a plurality of voice recognition engines to a mapping module. Each VR engine produces a hypothesis, i.e., word candidate, then the mapping module applies a mapping function to select a hypothesis from the hypotheses produced by the plurality of VR engines.

In one embodiment, speaker-independent voice recognition engines are combined. In another embodiment, speaker-dependent voice recognition engines are combined. In yet another embodiment, a speaker-independent voice recognition engine is combined with a speaker-dependent voice recognition engine.

In one embodiment, a speaker-independent voice recognition engine is a Dynamic Time Warping voice recognition engine. In one embodiment, a speaker-independent voice recognition engine is a Hidden Markov Model. In one embodiment, a speaker-dependent voice recognition engine is a Dynamic Time Warping voice recognition engine. In one embodiment, a speaker-dependent voice recognition engine is a Hidden Markov Model.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
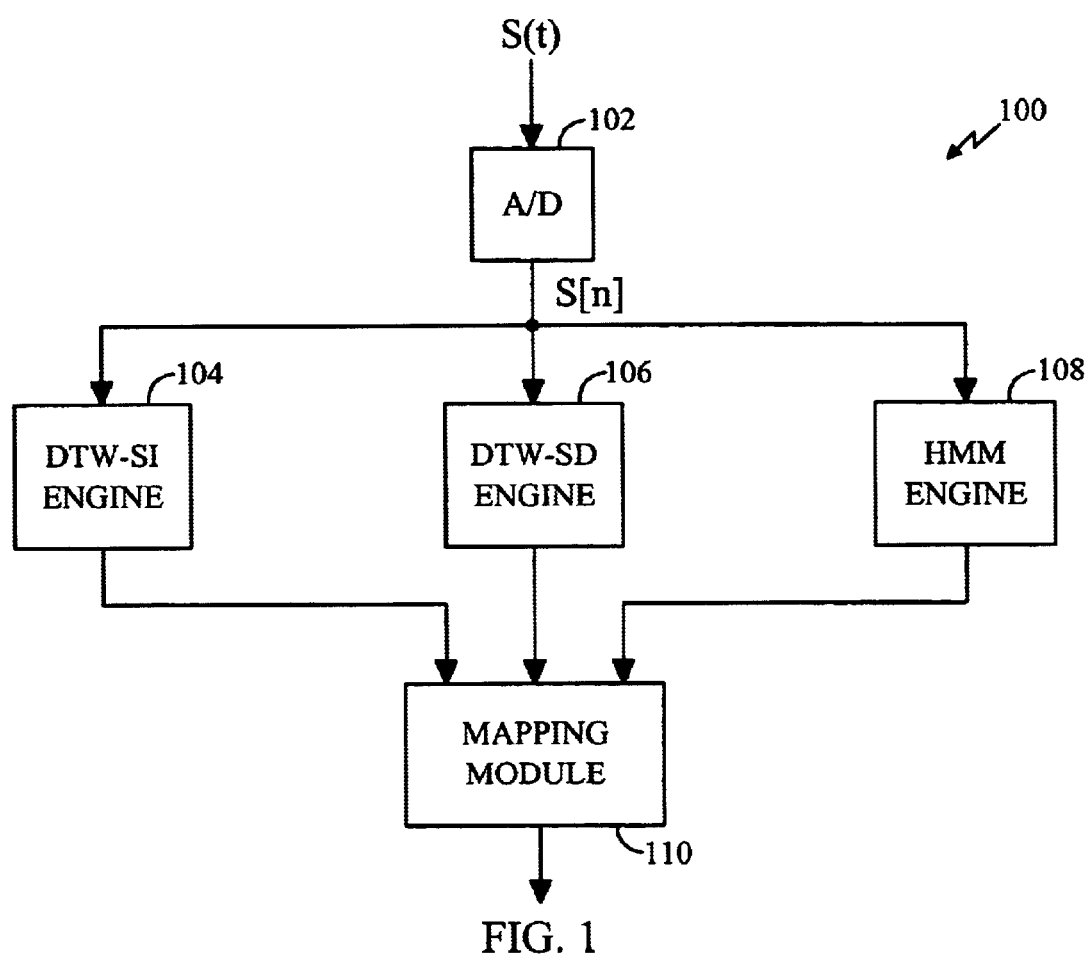
FIG. 1 shows an embodiment of a voice recognition system having three types of voice recognition engines.

In one embodiment, a voice recognition system 100 as shown in FIG. 1 has three types of voice recognition engines capable of performing isolated word recognition tasks: a dynamic time warping speaker independent (DTW-SI) engine 102, a dynamic time warping speaker-dependent (DTW-SD) engine 104, and a hidden Markov model (HMM) engine 108. These engines are used for command word recognition and digit recognition to provide rich spoken user interfaces to common tasks performed by a handheld device, such as, e.g., a mobile phone, personal digital assistant (PDA) etc. In another embodiment, the voice recognition system 100 comprises a DTW-SI 104 and a DTW-SD engine 106. In yet another embodiment, the voice recognition system 100 comprises a DTW-SI engine 104 and an HMM engine 108. In yet another embodiment, the voice recognition system 100 comprises a DTW-SD engine 106 and an HMM engine 108. In one embodiment, the HMM engine 108 is speaker independent. In another embodiment, the HMM engine 108 is speaker-dependent. It would be understood by those skilled in the art that any VR engine known in the art may be used. In yet another embodiment, a plurality of other VR engines types are combined. It would also be apparent to those skilled in the art that the engines can be configured in any combination.

In accordance with one embodiment, as illustrated in FIG. 1, a voice recognition system 100 includes an analog-to-digital converter (A/D) 102, a DTW-SI engine 104, a DTW-SD engine 106, and an HMM engine 108. In one embodiment, the A/D 102 is a hardware A/D. In another embodiment, the A/D 102 is implemented in software. In one embodiment, the A/D 102 and the engines 104, 106, 108 are implemented as one device. It would be understood by those skilled in the art, that the A/D 102 and the engines 104, 106, 108 may be implemented and distributed among any number of devices.

The A/D 102 is coupled to the DTW-SI engine 104, the DTW-SD engine 106, and the HMM engine 108. The DTW-SI engine 104, the DTW-SD engine 106, and the HMM engine 108 are coupled to a mapping module 110. The mapping module takes as input the outputs of the engines 104, 106, 108 and produces a word corresponding to a speech signal s(t).

The voice recognition system 100 may reside in, e.g., a wireless telephone or a hands-free car kit. A user (not shown) speaks a word or phrase, generating a speech signal. The speech signal is converted to an electrical speech signal, s(t), with a conventional transducer (not shown). The speech signal, s(t), is provided to the A/D 102, which converts the speech signal to digitized speech samples in accordance with a known sampling method such as, e.g., pulse coded modulation (PCM), A-law, or $\mu$-law. In one embodiment, typically, there are N 16-bit speech samples every second. Thus, N=8,000 for 8,000 Hz sampling frequency and N=16,000 for 16,000 Hz sampling frequency.

The speech samples are provided to the DTW-SI engine 104, the DTW-SD engine 106, and the HMM engine 108. Each engine processes the speech samples and produces hypotheses, i.e., candidate words for the speech signal s(t). The mapping module then maps the candidate words onto a decision space, which is evaluated in order to select the candidate word that best reflects the speech signal s(t).

Figure 2:
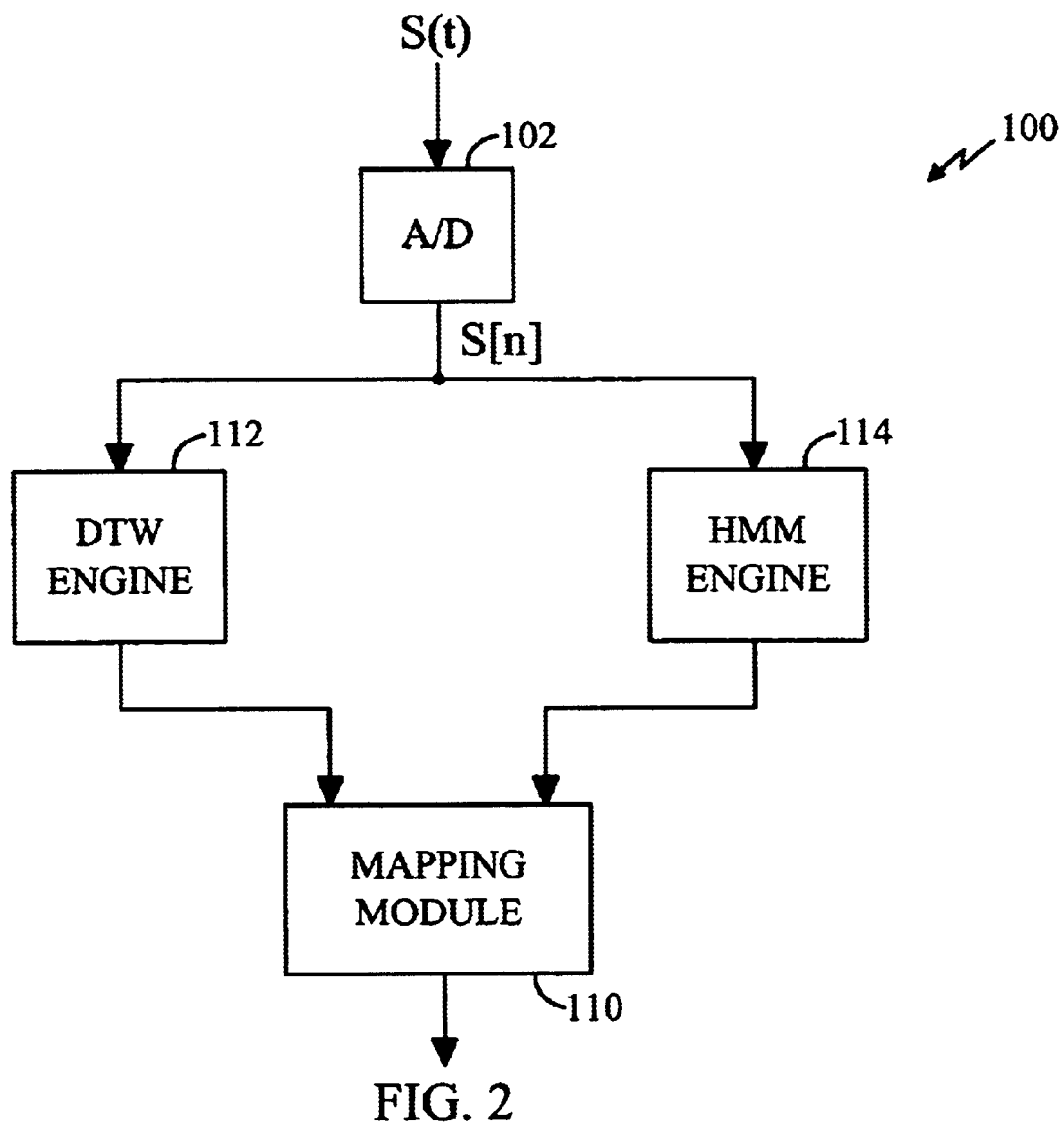
FIG. 2 shows a voice recognition system including a DTW engine and an HMM engine.

In one embodiment, the voice recognition system includes two VR engines as shown in FIG. 2. The voice recognition system 100 includes a DTW engine 112 and an HMM engine 114. In one embodiment, the DTW engine is a speaker-independent VR engine. In another embodiment, the DTW engine is a speaker-dependent VR engine. In one embodiment, the HMM engine is a speaker-independent VR engine. In another embodiment, the HMM engine is a speaker-dependent VR engine.

In these embodiments, the system has the advantages of both DTW and HMM engines. In one embodiment, DTW and HMM templates are created explicitly during a training phase in which the voice recognition system is trained to recognize input speech signals. In another embodiment, DTW and HMM templates are created implicitly during typical usage of the voice recognition system. Exemplary training systems and methods are described in U.S. patent application Ser. No. 09/248,513 entitled "VOICE RECOGNITION REJECTION SCHEME", filed Feb. 8, 1999, which is assigned to the assignee of the present invention and fully incorporated herein by reference, and U.S. patent application Ser. No. 09/225,891, entitled "SYSTEM AND METHOD FOR SEGMENTATION AND RECOGNITION OF SPEECH SIGNALS", filed Jan. 4, 1999, which is assigned to the assignee of the present invention and fully incorporated herein by reference.

A set of templates for all of the vocabulary words of the voice recognition system are stored in any conventional form of nonvolatile storage medium, such as, e.g., flash memory. This allows the templates to remain in the storage medium when the power to the voice recognition system 100 is turned off. In one embodiment, the set of templates is constructed with a speaker-independent template building system. In one embodiment, command words are included in a VR engine vocabulary.

The DTW technique is known in the art and described in Lawrence Rabiner & Biing-Hwang Juang, Fundamentals of Speech Recognition 200–238 (1993), which is fully incorporated herein by reference. In accordance with the DTW technique, a trellis is formed by plotting a time sequence of the utterance to be tested against a time sequence for each utterance stored in a template database. The utterance being tested is then compared, point by point (e.g., every 10 ms), with each utterance in the template database, one utterance at a time. For each utterance in the template database, the utterance being tested is adjusted, or "warped," in time, being either compressed or expanded at particular points until the closest possible match with the utterance in the template database is achieved. At each point in time the two utterances are compared, and either a match is declared at that point (zero cost), or a mismatch is declared. In the event of a mismatch at a particular point, the utterance being tested is compressed, expanded, or if necessary, mismatched. The process is continued until the two utterances have been completely compared against each other. A large number (typically thousands) of differently adjusted utterances is possible. The adjusted utterance having the lowest cost function (i.e., requiring the least number of compressions and/or expansions and/or mismatches) is selected. In similar fashion to a Viterbi decoding algorithm, the selection is advantageously performed by looking backward from each point in the utterance in the template database to determine the pathway having the lowest total cost. This permits the lowest-cost (i.e., most closely matched) adjusted utterance to be determined without resorting to the "brute-force" method of generating every possible one of the differently adjusted utterances. The lowest-cost adjusted utterances for all of the utterances in the template database are then compared and the one having the lowest cost is selected as the stored utterance most closely matched to the tested utterance.

Although DTW matching schemes in a DTW engine 104 and Viterbi decoding in an HMM engine 108 are similar, the DTW and HMM engines, utilize different front end schemes, i.e., feature extractors, to provide feature vectors to the matching stage. For this reason, the error patterns of the DTW and HMM engines are quite different. A voice recognition system with a combined engine takes advantage of differences in error patterns. By combining the results from both the engines properly, a higher overall recognition accuracy may be achieved. More importantly, lower rejection rates for desired recognition accuracy may be achieved.

In one embodiment, speaker-independent voice recognition engines operating the same vocabulary set are combined. In another embodiment, speaker-dependent voice recognition engines are combined. In yet another embodiment, a speaker-independent voice recognition engine is combined with a speaker-dependent voice recognition engine, both engines operating on the same vocabulary set. In yet another embodiment, a speaker-independent voice recognition engine is combined with a speaker-dependent voice recognition engine, both engines operating on different vocabulary sets.

Each engine produces an output as to which word in its vocabulary was spoken. Each output includes a word candidate for the input signal. Words that do not correspond to the input signal are rejected. Exemplary rejection schemes are described in U.S. patent application Ser. No. 09/248,513, fully incorporated herein by reference.

Accurate speech recognition is difficult for an embedded system, in part because of its limited computing resource. To increase system accuracy, speech recognition is accomplished using multiple recognition engines. Different VR engines, however, may produce different outcomes. For example, one engine might choose "Jane" and "Joe" as top candidate words, whereas another VR engine might choose "Julie" and "Joe" as the top two candidates. These different results need to be resolved. An answer must be given, i.e., a candidate word needs to be selected. The VR system has to reach a decision based on these candidate words for multiple engines to be functional.

In one embodiment, there are X (X=2, 3, . . . ) engines combined, each engine producing Y (Y=1, 2, . . . ) candidate words. Therefore, there are X*Y candidates out of which only one is the correct answer. In another embodiment, each engine may produce a different number of candidates.

In an embodiment with two engines D and H, $d_1$ and $d_2$ denote the distance between the test utterance and the top two candidate words of engine D, and $h_1$ and $h_2$ denote the distance between the test utterance and the top two candidate words of engine H. The variables $d_g$ and $h_g$ denote the distance between the test utterance and the "garbage" templates of engine D and H, respectively. The garbage templates are used to represent all words not in the vocabulary.

In one embodiment, the decision of selecting a candidate from the candidates produced by the VR engines is made based on a mapping from the measurement space $(d_1, d_2, \ldots d_g$ and $h_1, h_2 \ldots h_g)$ to the decision space (accept/reject the test utterance as one of the words in the list). In one embodiment, the mapping is a linear mapping. In another embodiment, the mapping is a nonlinear mapping.

Figure 3:
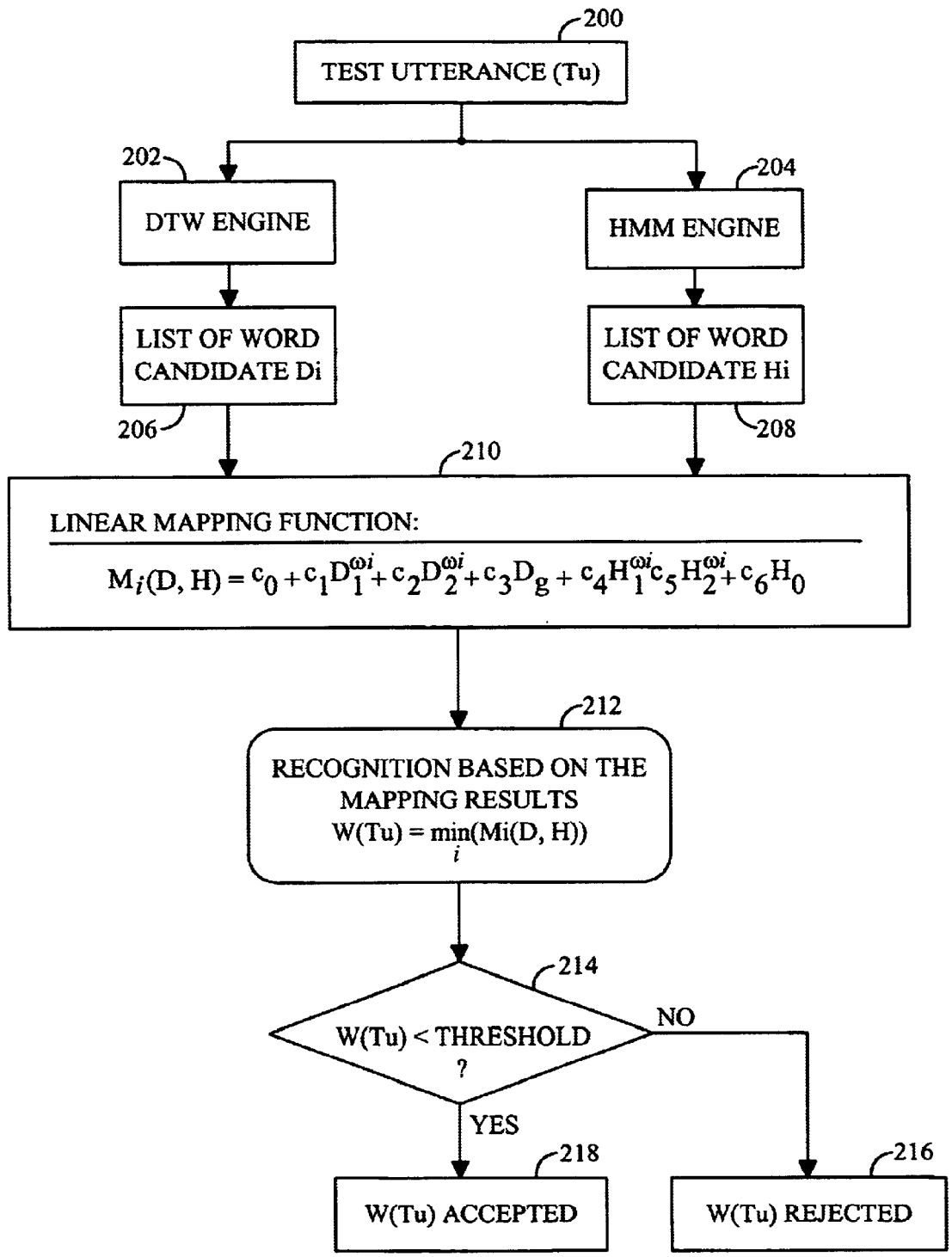
FIG. 3 shows an embodiment of a voice recognition system with two voice recognition engines.

In accordance with one embodiment, a flowchart of method steps performed by a device having a DTW-based VR engine and an HMM-based VR engine is shown in FIG. 3. In step 200, a test utterance $T_u$ is obtained. Once the test utterance $T_u$ is obtained, a DTW voice recognition analysis is performed on the test utterance $T_u$ in step 202 and an HMM voice recognition analysis is performed on the test utterance $T_u$ in step 204. In step 206, a set of DTW candidate words $D_i$ is obtained. In step 208, a set of HMM candidate words $H_i$ is obtained. In step 210, a linear mapping function is applied to each DTW candidate word $D_i$ and each HMM candidate word $H_i$. In step 212, recognition of a candidate word is based on the linear mapping results. In step 212, the candidate word with the minimum mapping function value is chosen as a recognized word $W(T_u)$. In step 214, the mapping function value of the recognized word $W(T_u)$ is compared to a threshold. If the mapping function value of the recognized word $W(T_u)$ is less than the threshold, the recognized word is rejected in step 216. If the mapping function value of the recognized word $W(T_u)$ is greater than the threshold, the recognized word is accepted in step 218.

$D_i^{W_j}$ is the distance between a test utterance $T_u$ 200 and in-vocabulary words, $W_j, j=1,2, \ldots ,N$. $W_j$ is a set of candidate words where index j is the set number and N is the number of sets. Each set has a number of candidate words, the number being a positive integer. Index i is the VR engine number.

Each VR engine also produces a distance $D_g$ between the test utterance $T_u$ and the out-of-vocabulary word template $W_g$. An in-vocabulary word is a word that is in the vocabulary of a VR engine. An out-of-vocabulary word is a word that is not in the vocabulary of a VR engine.

If the result of the mapping function is greater than a threshold, the candidate word evaluated is valid and the input is accepted. Otherwise, the input is rejected.

Table 1 shows a matrix of distances in an embodiment with a DTW engine and an HMM engine, wherein the top two words from each engine are chosen to be the candidate set. $D_1$ and $D_2$ are distances for the top two candidate words from the DTW VR engine and $H_1$ and $H_2$ are the distances for the top two candidate words from the HMM VR engine.

In an embodiment with two VR engines where one VR engine produces X distances and the other engine produces Y distances, a total of X*Y candidate words is produced.

Only one word from a candidate set will be recognized and a decision is made determining if the recognition should be rejected/accepted. In one embodiment, a linear mapping function is used for both choosing a word from the candidate set, and making the decision to accept or reject.

Each set of candidate words, $W_i$, i=1, 2, 3, 4, has its corresponding measurement vectors as shown in table 1.

TABLE 1

| $W_1$: | $D_1^{W_1}$ | $D_2^{W_1}$ | $D_g$ | $H_1^{W_1}$ | $H_2^{W_1}$ | $H_g$ |
|---|---|---|---|---|---|---|
| $W_2$: | $D_1^{W_2}$ | $D_2^{W_2}$ | $D_g$ | $H_1^{W_2}$ | $H_2^{W_2}$ | $H_g$ |
| $W_3$: | $D_3^{W_3}$ | $D_2^{W_3}$ | $D_g$ | $H_1^{W_3}$ | $H_2^{W_3}$ | $H_g$ |
| $W_4$: | $D_4^{W_4}$ | $D_2^{W_4}$ | $D_g$ | $H_1^{W_4}$ | $H_2^{W_4}$ | $H_g$ |

D denotes a DTW engine. H denotes an HMM engine. $D_1^{W_i}$ is the distance between $T_u$ and $W_i$, $D_2^{W_i}$ is the distance for the second best candidate excluding $W_i$, $D_g$ denotes the distance between $T_u$ and the garbage template. $H_1^{W_i}$, $H_2^{W_i}$, $H_g$ represent, respectively, the same quantities as for the DTW engine.

The linear mapping function has the form:

$M_i(D,H) = C_0 + c_1 D_1^{W_i} + c_2 D_2^{W_i} + c_3 D_g + c_4 H_1^{W_i} + c_5 H_2^{W_i} + c_n H_g$, where $c_i$ (i=0,1, ... n) is a real constant in one embodiment and is a speech parameter in another embodiment. The upper limit on the index i is n. The upper limit n is equal to the number of VR engines in the voice recognition system plus the number of candidate words for each VR engine. In an embodiment with two VR engines and two candidate words per VR engine, n=6. The calculation of n is shown below:

| Two VR engines | 2 |
|---|---|
| two candidate words for the first VR engine | +2 |
| two candidate words for the second VR engine | +2 |
| | n = 6 |

The decision rules for word recognition and word acceptance are as follows:

1. The word that maximizes $M_i$ (D,H) is chosen as the word to be recognized; and
2. The recognition is accepted when $M_i$ (D,H)>0 and rejected when $M_i$ (D,H)≤0.

The mapping function can be constructed or trained objectively to minimize false acceptance/rejection errors. In one embodiment, the constants $c_i$ (i=0,1, ..., n) are obtained from training. In the training process, the identity of each testing sample is known. The measurement vector of one word (among $W_1$, $W_2$, $W_3$, and $W_4$) is marked as correct (+1), and the rest are marked as incorrect (−1). Training determines the value of the coefficient vector c=$c_i$(i=0,1, ... n) in order to minimize the number of misclassifications.

Vector b is a vector that indicates the correct/incorrect nature of each training vector, and W is the measurement matrix where each row is a measurement vector $D_1^{W_i}$, $D_2^{W_i}$, $D_g$, $H_1^{W_i}$, $H_2^{W_i}$, $H_g$, (i=1, ... ,4). In one embodiment, the coefficient vector c is obtained by computing the pseudo-inverse of W:

$c = (W^T W)^{-1} W^T b$

This procedure minimizes the mean square error (MSE). In another embodiment, advanced error minimization procedures, such as minimizing the total error count, are also used to solve for the coefficient vector c. It would also be apparent to those skilled in the art that other error minimization procedures known in the art can be used to solve for the coefficient vector c.

The mapping function method is equally applicable to multiple (>2) engines and multiple (>2) word candidates. When there are L VR engines and each produces N word candidates, the generalized mapping function has the form:

$$Mi(c, V) = C_0 + \sum_{l=1}^{L} \sum_{k=1}^{N} c_k^l V(l)_k^{w_i}.$$

$C_0$ is the threshold constant. $c_k^l$ is the kth mapping constant for VR engine l. $V(l)_k^{W_i}$ is the kth distance for the word candidate $W_i$ from VR engine l.

In one embodiment, the mapping function is nonlinear. One or more variables/parameters are used in the mapping function instead of coefficients. In one embodiment, the one or more variables/parameters used in the mapping function are speech parameters from a VR engine. It would also be apparent to those skilled in the art that the one or more variables/parameters can be speech parameters taken from the measurement or processing of the speech signal s(t).

Thus, a novel and improved method and apparatus for combining engines for voice recognition has been described. Those of skill in the art would understand that the various illustrative logical blocks, modules, and mapping described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, and mapping described in connection with the embodiments disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The A/D 102, the VR engines, and the mapping module 110 may advantageously be executed in a microprocessor, but in the alternative, the A/D 102, the VR engines, and the mapping module 110 may be executed in any conventional processor, controller, microcontroller, or state machine. The templates could reside in RAM memory, flash memory, ROM memory, EPROM memory, EEPROM memory, registers, hard disk, a removable disk, a CD-ROM, or any other form of storage medium known in the art. The memory (not shown) may be integral to any aforementioned processor (not shown). A processor (not shown) and memory (not shown) may reside in an ASIC (not shown). The ASIC may reside in a telephone.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A voice recognition system, comprising:
   a plurality of voice recognition (VR) engines, each voice recognition engine configured to produce a word candidate; and
   a mapping module that is configured to take as input the word candidates from the plurality of VR engines and select a word candidate based on a mapping function, wherein the mapping function is:

$$M_i(F,S) = C_0 + c_1 F_1^{W_i} + c_2 F_2^{W_i} + c_3 F_g + c_4 S_1^{W_i} + c_5 S_2^{W_i} + c_n S_g$$

wherein F is a first voice recognition engine, S is a second voice recognition engine, $F_1^{W_i}$ is the distance between utterance $T_u$ and candidate word $W_i$, $F_2^{W_i}$ is the distance for the second best candidate excluding $W_i$, $D_g$ denotes the distance between $T_u$ and a garbage template, $S_1^{W_i}$ is the distance between utterance $T_u$ and $W_i$, $S_2^{W_i}$ is the distance for the second best candidate excluding $W_i$, $S_g$ denotes the distance between $T_u$ and the garbage template, and $c_i$ (i=0,1, ... n) is a coefficient and upper limit n is equal to the sum of the number of VR engines plus the sum of the candidate words for each VR engine.

2. The voice recognition system of claim 1, wherein the coefficient is a real constant.

3. The voice recognition system of claim 1, wherein the coefficient is a speech parameter.

4. A voice recognition system, comprising:
   a plurality of voice recognition (VR) engines, each voice recognition engine configured to produce a word candidate; and
   a mapping module that is configured to take as input the word candidates from the plurality of VR engines and select a word candidate based on a mapping function, wherein the mapping function is:

$$Mi(c, V) = C_0 + \sum_{l=1}^{L} \sum_{k=1}^{N} c_k^l V(l)_k^{w_i},$$

wherein $C_0$ is a threshold constant, $c_k^l$ is a kth mapping constant for VR engine l, and $V(l)_k^{W_i}$ is a kth distance for word candidate $W_i$ from VR engine l.

5. A method of voice recognition, comprising:
   obtaining at least one candidate word for a test utterance, wherein the word candidate is represented by a distance between a word candidate template and the test utterance; and
   selecting a recognized word from the at least one candidate word based on a mapping function, wherein the mapping function multiplies each distance by a coefficient and adds the products and another coefficient $C_0$, thereby producing a sum.

6. The method of claim 5, wherein a recognized word is selected based on the sum.

7. A method of voice recognition, comprising:
   obtaining at least one candidate word for a test utterance; and
   selecting a recognized word from the at least one candidate word based on a mapping function, wherein the mapping function is:

$$M_i(F,S) = C_0 + c_1 F_1^{W_i} + c_2 F_2^{W_i} + c_3 F_g + c_4 S_1^{W_i} + c_5 S_2^{W_i} + c_n S_g$$

wherein F is a first voice recognition engine, S is a second voice recognition engine, $F_1^{W_i}$ is the distance between utterance $T_u$ and candidate word $W_i$, $F_2^{W_i}$ is the distance for the second best candidate excluding $W_i$, $D_g$ denotes the distance between $T_u$ and a garbage template, $S_1^{W_i}$ is the distance between utterance $T_u$ and $W_i$, $S_2^{W_i}$ is the distance for the second best candidate excluding $W_i$, $S_g$ denotes the distance between $T_u$ and the garbage template, and $c_i$ (i=0,1, ... n) is a coefficient and upper limit n is equal to the sum of the number of VR engines plus the sum of the candidate words for each VR engine.

8. The method of claim 7, wherein the coefficient is a real constant.

9. The method of claim 7, wherein the coefficient is a speech parameter.

10. A method of voice recognition, comprising:
    obtaining at least one candidate word for a test utterance; and
    selecting a recognized word from the at least one candidate word based on a mapping function, wherein the mapping function is:

$$Mi(c, V) = C_0 + \sum_{l=1}^{L} \sum_{k=1}^{N} c_k^l V(l)_k^{w_i},$$

wherein $C_0$ is a threshold constant, $c_k^l$ is a kth mapping constant for VR engine l, and $V(l)_k^{W_i}$ is a kth distance for word candidate $W_i$ from VR engine l.

11. A method of voice recognition, comprising:
    obtaining a test utterance;
    analyzing the test utterance;
    providing at least one candidate word for the test utterance based on the analysis of the test utterance;
    applying a mapping function to the at least one candidate word;
    selecting a candidate word from the at least one candidate word based on the mapping function value of the at least one candidate word; and
    comparing the mapping function value of the selected candidate word to a threshold.

12. The method of claim 11 further comprising accepting the selected candidate word based on the comparison.

13. The method of claim 11 further comprising rejecting the selected candidate word based on the comparison.

* * * * *